(12) United States Patent
Vergeest

(10) Patent No.: US 6,246,026 B1
(45) Date of Patent: Jun. 12, 2001

(54) PROCESS FOR CUTTING AN OPTICAL FIBER

(75) Inventor: Henricus Jozef Vergeest, 's-Hertogenbosch (NL)

(73) Assignee: The Whitaker Corporation, Wilmington, DE (US)

(*) Notice: Subject to any disclaimer, the term of this patent is extended or adjusted under 35 U.S.C. 154(b) by 0 days.

(21) Appl. No.: 09/395,352

(22) Filed: Sep. 14, 1999

(30) Foreign Application Priority Data

Sep. 18, 1998 (EP) .................................................. 98117698

(51) Int. Cl.[7] .................................................. B23K 26/00
(52) U.S. Cl. ................................ 219/121.72; 219/121.85; 65/392
(58) Field of Search ........................ 219/121.72, 121.82, 219/121.61, 121.85; 65/392, 425, 433, 441, 480, 112

(56) References Cited

U.S. PATENT DOCUMENTS

| | | | |
|---|---|---|---|
| 4,158,555 | * | 6/1979 | Kellenborn .................. 219/121.72 X |
| 5,226,101 | | 7/1993 | Szentesi et al. . |
| 5,983,676 | * | 11/1999 | Brown .......................... 219/121.72 X |

FOREIGN PATENT DOCUMENTS

| | | |
|---|---|---|
| 0 387 583-A2 | 9/1990 | (EP) . |
| 442 202-A2 | 8/1991 | (EP) . |
| 0 531 225-B1 | 1/1996 | (EP) . |
| 2 538 916 | 7/1984 | (FR) . |
| 21 10 358 | 6/1983 | (GB) . |
| 54-030590 | 3/1979 | (JP) . |
| 55-154337 | 12/1980 | (JP) . |
| 56-122691 * | 9/1981 | (JP) . |
| 58-70767 * | 4/1983 | (JP) . |
| 58-070767 | 4/1983 | (JP) . |
| 58-145387 | 8/1983 | (JP) . |
| 63-188485 * | 8/1988 | (JP) . |

OTHER PUBLICATIONS

European Search Report.

* cited by examiner

Primary Examiner—Samuel M. Heinrich
(74) Attorney, Agent, or Firm—Synnestvedt & Lechner LLP

(57) ABSTRACT

A process for cutting or splitting at least one optical fiber at a predetermined angle, wherein the fiber is introduced into a holding and positioning device and is cut by a pulsed laser beam.

10 Claims, 2 Drawing Sheets

PROCESS FOR CUTTING AN OPTICAL FIBER

BACKGROUND OF THE INVENTION

1. Field of the Invention

The invention relates to a process for cutting at least one optical fiber at a predetermined angle, wherein the fiber is introduced into a holding and positioning device.

2. Description of the Prior Art

Optical fibers made of glass are often used in optical transmission systems and other optical systems. The machining of the end face of these fibers plays a crucial role during the use of these monomode or multimode fibers. It is important that the end faces have a particularly uniform surface so that the transition from one fiber end to another or to an active element can be carried out with damping values which are as low as possible. It is also important that the end faces of the fibers can be produced at predetermined angles and that these angles are reliable and reproducible.

Various mechanical processes are currently known for severing optical fibers. With all processes, the fiber is essentially fixed in a holding device consisting of two holders which are then mutually offset, for example, so that the correct angle is ensured during the cutting operation. Diamond cutters, for example, are used. It is also known to twist the fiber or begin to cut and then break the fibers which are to be cut. All these processes are expensive. In addition, they are also applicable to the parallel fibers of a ribbon cable only under certain conditions.

It is known from EP 531 225 that in order to sever an optical fiber, the optical fiber may be fixed between two carriers of a holding and positioning device, then one of the carriers is offset perpendicularly to the optical axis of the fibers and a cutting blade is used to cut the fibers at a desired angle. This process can also be used for the number of fibers in a ribbon cable which are arranged parallel to one another.

SUMMARY OF THE INVENTION

It is an object of the invention to provide a process for cutting at least one optical fiber with a high degree of accuracy relative the cutting angle that is produced.

The object is achieved by a process for cutting at least one optical glass fiber at a predetermined angle which comprises the steps of: (a) introducing the glass fiber into a holding and positioning device; (b) actuating a laser device to deliver a pulsing beam having sufficient energy to ablate glass; and (c) effecting the relative movement of the beam across the fiber at the predetermined angle to ablate the glass and produce an end face.

With the process according to the invention for the cutting of at least one optical fiber at a predetermined angle, the fiber is introduced into a holding and positioning device and the fiber is then cut by means of a laser which delivers short, high-power pulses. As a result, a fiber end face can be produced at a predetermined angle with a high reliability with respect to the angle desired, while the fiber end face that results is very uniform such that additional machining of the fiber end face is unnecessary.

It is also particularly advantageous that only a minimal quantity of glass is melted during the cutting of the fiber. The holding and positioning device is designed so that the fiber is fastened therein, the device is adjustable at predetermined angles relative the laser beam, and the fiber can be moved through the laser beam when the laser beam is activated. A $CO_2$ laser, for example, can be used. $CO_2$ lasers have proven particularly advantageous owing to the high speed at which they can operate and the resultant cost effectiveness. The fiber material is removed by ablation by the $CO_2$ laser during the cutting process. The glass is not melted in the process, but sublimated. It is also possible to use excimer lasers.

The $CO_2$ laser is operated in a pulsed mode for cutting the fiber. The pulse energy is very high. The pulses are very short and have very steep edges, in other words the maximum pulse energy is achieved very rapidly. The peak power of the pulse is between 0.1 and 1000 watts, the pulse length being >50 fs. Very good results are achieved with a $CO_2$ laser (wavelength 10.6 $\mu$m) having a pulse length of 35 $\mu$s and a peak power of 600 watts. Other lasers with wavelengths between 0.1 and 1.5 $\mu$m and 8.5 $\mu$m to 10 $\mu$m can basically also be used.

Whereas former mechanical systems have typical angle tolerances of +/−0.5 $\mu$, angle tolerances of less than 0.2$\mu$ can be achieved with the process according to the invention. With the present process it is possible to cut not only individual fibers at an angle, but also fibers of a ribbon cable.

DETAILED DESCRIPTION OF THE PREFERRED EMBODIMENT

Figure 1:
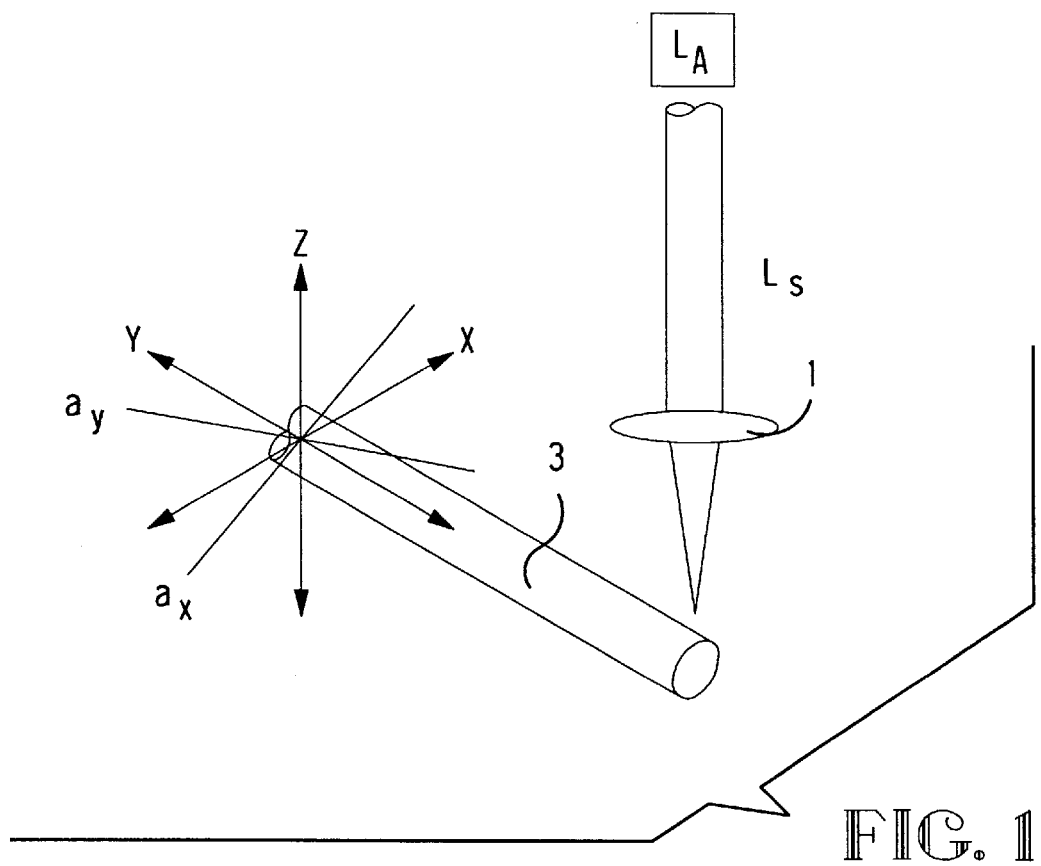
FIG. 1 is a schematic view of an optical waveguide with a coordinate system and a laser beam.
Figure 2:
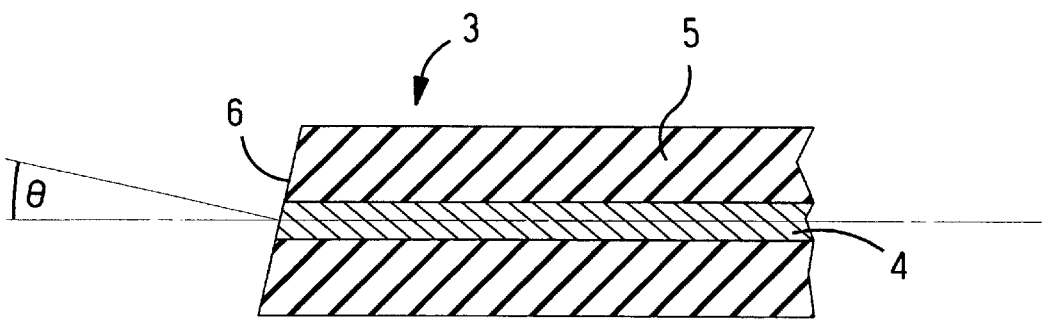
FIG. 2 is a cross section through one end of an optical waveguide.

A laser LA from which a laser beam Ls issues is initially required for carrying out the process of cutting a fiber 3. The laser beam $L_s$ is concentrated by a lens 1. The laser beam $L_s$, once concentrated in this way, impinges on the optical fiber 3. The optical fiber 3 is a glass fiber, for example a monomode or multimode fiber. As shown in FIG. 2, the fiber 3 consists of a fiber core 4 and a fiber sheath 5 so that the light is guided substantially in the fiber core 4. The fiber 3 is arranged in a holding and positioning device and is orientatable relative to the laser $L_A$. For example, it can be orientated along the axis $a_y$ and then be moved along the axis X relative to the laser beam $L_s$. However, it is also possible for the fiber 3 to be moved along the axis $a_x$. A surface 6 of the fiber 3 is produced at an inclination angle to the fiber axis, as shown in FIG. 2. The angle of inclination should be accurately reproducible, and this is achieved by the proposed process. For carrying out the process, the laser transmits short high-energy pulses of laser light, so that the material of the fiber is sublimated.

A very accurate and high quality surface of the fiber is achieved by "laser cutting", so additional machining of the fiber surface after cutting, as is normal with mechanical cutting processes, is no longer necessary. The fiber end face 6 is finished sufficiently after cutting with the laser.

Figure 3:
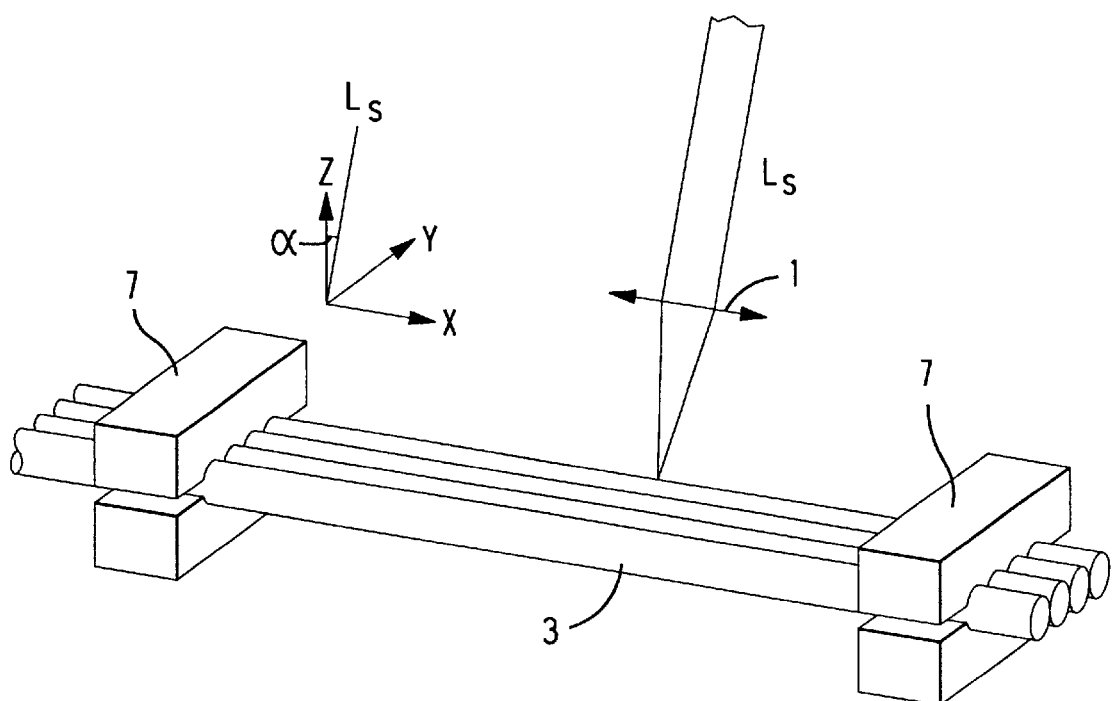
FIG. 3 is a schematic view of optical waveguides of a ribbon cable which are fastened in a holding and positioning device.

As shown in FIG. 3, with the process according to the invention, it is possible not only to cut an individual fiber and adequately finish the end surface at the same time, but it is also possible to cut a bundle of fibers 3 orientated parallel to one another, for example a ribbon cable, simultaneously with the same surface qualities. For this purpose, the fibers 3 that make up a bundle (ribbon cable) are introduced into a positioning device 7. The positioning device 7 ensures that the fibers 3 are arranged parallel to one another. The longitudinal axis of the fibers 3 coincides, for example, with the X-axis of a coordinate system. The positioning device 7 can now be driven along the direction of the Y-axis in a manner that ensures that the fibers 3 remain in parallel orientation. A laser beam $L_s$, of which the direction is inclined by an angle α to the Z-axis, is concentrated onto the fibers 3 by means of a lens 1 and operated in a mode with short high-energy pulses described above. The fibers 3 pass through the laser beam $L_s$ and are thus cut and the end faces simultaneously finished.

Advantageously, this process ensures that all fibers of the ribbon cable are cut at the same angle with an equally high end face quality.

I claim:

1. A process for cutting at least one optical glass fiber at a predetermined angle, the process comprising the steps of:

introducing the glass fiber into a holding and positioning device;

actuating a laser device to deliver a pulsing beam having sufficient energy to ablate glass; and effecting the relative movement of the beam across the fiber at a predetermined angle to ablate the glass and produce an end face.

2. The process according to claim 1 wherein a plurality of fibers are introduced into the holding and positioning device parallel to one another and moving the beam across the plurality so that the fibers are cut in succession.

3. The process according to claim 1 wherein the fiber is a ribbon fiber having multiple fibers therein.

4. The process according to claim 1 wherein the laser is a $CO_2$ laser.

5. The process according to claim 4, wherein the laser device delivers pulses with peak power between 0.1 and 1000 watts and the pulse length is greater than 50 fs.

6. The process according to claim 4, wherein the laser device delivers pulses at a wavelength of 10 0.6 $\mu$m having a peak power of 600 watts and a pulse length of 35 $\mu$s.

7. The process according to claim 1, wherein the end face is not normal to the axis of the fiber.

8. The process according to claim 7, wherein the holding and positioning device has an x,y, and z-axis and the fiber is held such that the y-axis is parallel to the axis of the fiber, and wherein the beam is moved across the fiber at the predetermined angle from the z-axis.

9. The process according to claim 7, wherein the holding and positioning device has an x,y, and z-axis and the fiber is held such that the y-axis is parallel to the axis of the fiber, and wherein the beam is moved across the fiber at the predetermined angle from the y-axis.

10. The process according to claim 1, wherein the predetermined angle is achieved by orienting the holding and position device at the predetermined angle relative to the beam.

* * * * *

UNITED STATES PATENT AND TRADEMARK OFFICE
CERTIFICATE OF CORRECTION

PATENT NO.        : 6,246,026 B1                                      Page 1 of 1
APPLICATION NO. : 09/395352
DATED             : June 12, 2001
INVENTOR(S)       : Henricus Jozef Vergeest It is certified that error appears in the above-identified patent and that said Letters Patent is hereby corrected as shown below:

In Claim 6, line 2 delete "10 0.6" and replace it with --10.6--.

Signed and Sealed this

Twenty-second Day of June, 2010

David J. Kappos
*Director of the United States Patent and Trademark Office*

UNITED STATES PATENT AND TRADEMARK OFFICE
CERTIFICATE OF CORRECTION

PATENT NO. : 6,246,026 B1  Page 1 of 1
APPLICATION NO. : 09/395352
DATED : June 12, 2001
INVENTOR(S) : Henricus Jozef Vergeest It is certified that error appears in the above-identified patent and that said Letters Patent is hereby corrected as shown below:

Column 4, line 9 (Claim 6, line 2) delete "10 0.6" and replace it with --10.6--.

This certificate supersedes the Certificate of Correction issued June 22, 2010.

Signed and Sealed this

Twentieth Day of July, 2010

David J. Kappos
*Director of the United States Patent and Trademark Office*